Nov. 29, 1949       E. A. STALKER       2,489,683
TURBINE
Filed Nov. 19, 1943                     3 Sheets-Sheet 1

INVENTOR
Edward A. Stalker
By Marechal and Biebel
ATTORNEYS

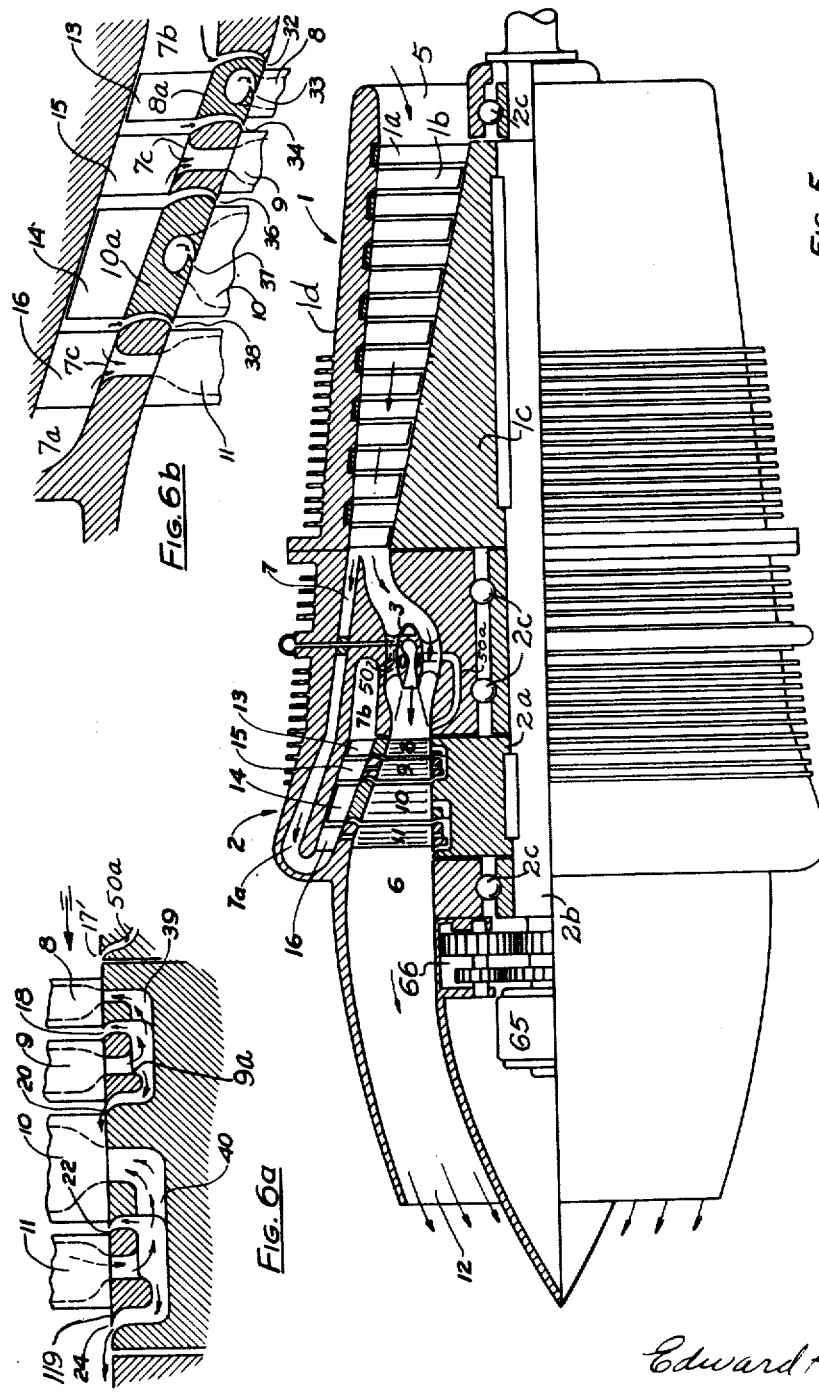

Nov. 29, 1949  E. A. STALKER  2,489,683
TURBINE
Filed Nov. 19, 1943  3 Sheets-Sheet 3

INVENTOR.
Edward A. Stalker
By Marechal and Biebel
ATTORNEYS

UNITED STATES PATENT OFFICE 2,489,683

TURBINE

Edward A. Stalker, Bay City, Mich.

Application November 19, 1943, Serial No. 510,884

14 Claims. (Cl. 60—41)

This invention relates to turbines and particularly to the type known as the gas turbine.

It has for its principal object to provide a gas turbine having high thermal efficiency and operating with high gas temperatures and in which the parts in the high temperature zone are protectively cooled without objectionably affecting the overall efficiency.

It is a further object to provide a blade form for such a turbine especially adapted to cool operation and high efficiency.

Other objects will appear from the following description, the accompanying drawings, and the appended claims.

I accomplish the above objects by the means illustrated in the accompanying drawings in which—

Fig. 5 is a view partly in axial section and partly in side elevation of a turbine constructed in accordance with the present invention;

Fig. 6a is a fragmentary section on a still larger scale of the hub wall of Fig. 6 in the zone of the turbine blades;

Fig. 6b is a similar fragmentary section of the outer wall of Fig. 6 in the zone of the turbine blades;

The gas turbine is recognized as having many advantages over reciprocating engines as a source of power but in order to secure high thermal efficiency, it is necessary for it to operate at high temperatures, and this has hitherto presented difficulties in preventing the blades and other parts of the turbine from becoming heated to excessive or dangerous temperatures. In accordance with this invention, those parts which are normally subjected to high gas temperatures are prevented from excessive heating through the provision of a proper protective layer of cool air between the blades or other parts and the hot motive gas of the turbine. In order to be most effective these layers are made to be truly laminar in character and turbulence in the layers is reduced or prevented so that heat transfer by convection is substantially eliminated.

Figure 1:
Fig. 1 is a diagrammatic view representing the conditions of laminar flow of a gas over a surface.

A flow is said to be laminar when the air particles remain always in the same infinitesimal layer. Thus in Fig. 1 the particles on streamline $AA_1A_2$ always remain on this line and do not travel between the lines. If the layer becomes turbulent, a particle at A may an instant later be at B and can transfer heat quickly from A to B. It will be understood that all the so-called layers are extremely thin and that they are not positively separated from each other.

The necessary condition for a laminar flow in addition to a smooth surface is that the pressure gradient act so as to accelerate the boundary layer in the general direction of flow. This latter condition is directly concerned with the location of the maximum thickness of the airfoil section used for the blade. The blade form will be discussed further subsequently.

The blade and walls of the turbine are equipped with slots so related and arranged that the entire surface of the turbine structure exposed to the hot gases is bathed by a protective flow which is made and remains substantially laminar for a substantial distance downstream from the slot.

Figure 3:
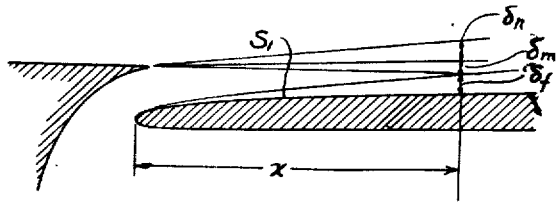
Figs. 2 and 3 are views through a discharge slot on an enlarged scale representing the conditions incident to the discharge of a flow through the slot and its intermixing with the main flow.
Figure 2:
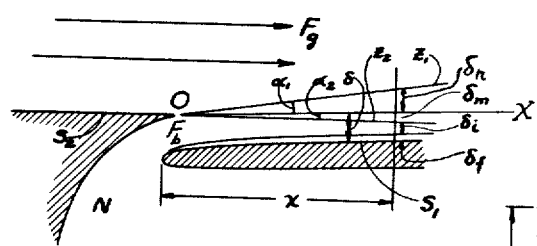

Fig. 2 illustrates the theory underlying the emission of the protective layers. The nozzle or slot N is discharging a jet of air. Along the wall $S_1$ a boundary layer forms due to rubbing on the walls. This is the thin layer in which the frictional retardation of the wall is active. In the distance $x$ from the slot opening the thickness of the boundary layer has become $\delta_t$. At the point O mixing begins between the gas flow $F_g$ and the insulating flow $F_b$ from the slot, assuming that there is turbulence in the flow $F_g$. In a distance $x$ the mixing zone has acquired a thickness $\delta_m + \delta_n$, the zone extending into the flow $F_b$ a distance $\delta_m$ and into the flow $F_g$ a distance $\delta_n$. It is clear that as long as the mixing zone does not become contiguous to the friction boundary layer there will remain an insulating layer $\delta_i$ which may be laminar. This is true even though the frictional boundary layer $\delta_f$ is turbulent. On the other hand the mixing zone may reach the outer boundary of the frictional boundary layer as shown in Fig. 3 without excessive heat transfer, if this frictional layer is laminar. The mixing zone should not however reach the wall $S_1$.

If two layers of fluids of equal density having the main velocities $u_1$ and $u_2$ begin mixing, the mixing zone boundary lines $Z_1$ and $Z_2$, Fig. 2, will make the angles $\alpha_1$ and $\alpha_2$ with the line OX. If $u_1$ is very nearly equal to $u_2$, that is, if $u_2$ is from 0.8 to 1.0 of $u_1$ then $$\alpha_2 \cong \alpha_1 = 0.17 \left[ \frac{u_1^2 - u_2^2}{u_1^2} \right] \text{ radians} \quad (2)$$

where $u_1$ and $u_2$ are in feet per second. Hence the thickness—

$$\delta_m = x \tan \alpha_2 \quad (3)$$

and since the angle is small and is approximately proportional to its tangent $$\delta_m \cong x \alpha_2 \quad (4)$$

where $\alpha_2$ is in radians.

If the frictional boundary layer is turbulent, the thickness of this layer is $$\delta_f = 0.377 \left( \frac{\mu}{\rho \bar{u} x} \right)^{1/5} \cdot x \text{ feet} \quad (5)$$

where—

$\bar{u}$ = is the velocity outside the frictional layer in feet per second
$\mu$ = coefficient of viscosity
$\rho$ = mass density of air or gas in slugs per cubic foot
$x$ = distance in feet downstream from the origin of the jet.

Equations 4 and 5 determine the distance $x$ for which $\delta_i$ becomes zero and therefore the maximum safe spacing of the slots which will provide for a maintained protective boundary layer. This is obtained through the following relationship in which the original thickness of the jet is $\delta_j$.

$$\delta_i = \delta_j - \delta_f - \delta_m \quad (6)$$

It follows from Equations 2 and 3 that if the slot width is about equal to the mixing thickness that the succeeding slot should be about 10 times the slot width downstream to keep the mixing region above the metal surface. In about four times this distance or 40 times the slot width the hot gas has penetrated the boundary layer. Thus a preferred spacing for the slots is between about 10 and 40 times the slot width.

Figure 4A:
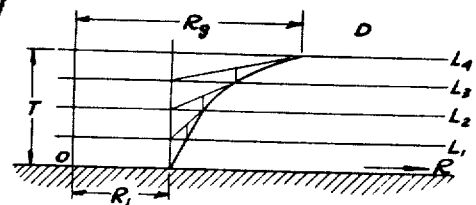
Figs. 4 and 4a are diagrammatic views showing the temperature distribution over the surface of the blade as affected by a series of discharge slots therein.
Figure 4:
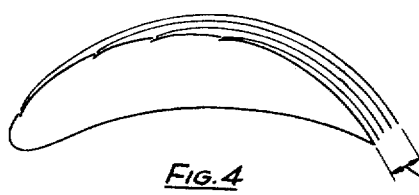

A plurality of slots should be used in the blades and they should be, in major part, in the forward 60 per cent of the chord because as indicated in Figs. 4 and 4a the layer tends to add, forming an increasingly thicker total layer T as the flow proceeds toward the trailing edge.

The distribution of temperature R in the layer T is shown by curve D, Fig. 4a, where R is on the Rankin scale which is degrees Fahrenheit absolute. Immediately adjacent the wall surface the temperature is $R_1$ substantially equal to the wall temperature. At the limit of the outer layer $L_4$ the temperature is $R_g$, the temperature of the motive gas, the temperature gradient being substantially as represented.

It will be seen therefore that the arrangement of the slots is very important in keeping the temperature at the wall low. In accordance with this invention the slots are in major part in the forward portion of the body so that they can provide the thick layer over the rear portion of the blade where turbulence in the layer has a greater tendency to form because of the adverse pressure gradient of the blade. Even if turbulence forms in the inner layer $L_1$ there will be little heat brought to the wall when the next outer layer $L_2$ and the other intermediate layers maintain laminar flow or are relatively cool as compared to layer $L^4$.

The maximum width of the slots is determined by the condition that they must not discharge so much cold air that the thermal efficiency is seriously reduced or lowered to the value which would obtain for an initial gas temperature requiring no protective layer. For present day metals this is a temperature of about 1500° R. Thus the sum of the widths of the blade slots preferably should be 6 per cent of the blade chord with upper and lower limits of 2 per cent and 10 per cent respectively; or the area of the blade slots should be about 5 per cent of the cross-sectional area of the main flow passage with upper and lower limits of 1.6 per cent and 8 per cent respectively.

The widths of the individual slots at the front of the blades should be between 0.2 per cent and 2 per cent with a preferred value of about 1 per cent. Preferably too the slot widths of the blades should decrease from the nose to the trailing edge of the blade. This is practicable because of the superimposing of the layers from succeeding slots.

With the slot width determined the chordwise space between it and the succeeding slot is given from Equation 4 as $$x = \frac{\delta_m}{\alpha_2} \quad (7)$$

where $x$ is in feet.

Figure 11:
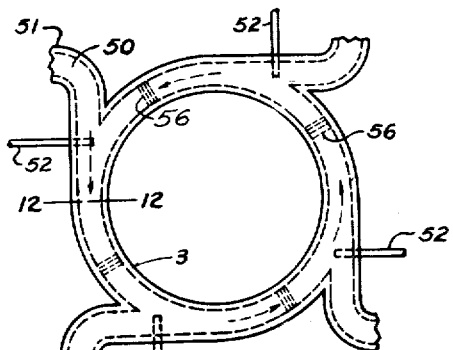
Fig. 11 is an end elevational view of the burner isolated from the remaining structure looking in the direction of the arrows 11—11 of Fig. 6.

Referring to the drawing which discloses a preferred embodiment of the invention, in Fig. 5 the compressor is shown at 1 and the turbine at 2. The compressor has the rotor blades 1a and stator blades 1b within the annular passage 5. The rotor blades are supported on the hub 1c and the stator blades from casing 1d. The compressor discharges directly into the passage 6 of the turbine 2 and also into the auxiliary passage 7. In passage 6 the burner 3 heats the air and mixes with it the burned fuel forming the gas which impinges on the rotor blades 8 of the first stage and 10 of the second stage. The burner 3 as shown in Fig. 11 is annular in shape and provides for discharge of the burning gases with a large peripheral component of velocity. The rotor blades are carried on hub 2a which like hub 1c is keyed to a common axial drive shaft. The stator blades are 9 and 11, the blades of the former forming the first stage and the blades of the latter the second stage. The gas then proceeds to the exit 12. The turbine and compressor shaft are shown integral as 2b. It is supported in the bearings 2c.

It will be realized that the gas downstream from the burner is at a very high temperature and it is desired to utilize the gas while its temperature remains high and of the order of 3500° F. absolute. If the blades are bathed continuously by such highly heated gas, they tend to take on this high temperature and hence provision is made to keep them relatively cool, i. e. at a temperature at which they can be successfully operated without any danger of distortion, weakening or rupture. As an example of a representative temperature, about 1500° F. absolute has been found satisfactory.

In order to maintain such controlled lower temperature, air at a relatively low temperature is conducted by the passage 7, 7a, 7b to be ejected from slots in the turbine wall and blades so as to provide and maintain a protective layer between them and the hot gas. In order to provide proper pressures at the various slots each rotor of the turbine also carries pump blades 13 and 14 respectively in the passage 7a—7b. These are accompanied by and alternate with the stator blades 15 and 16.

Figure 6:
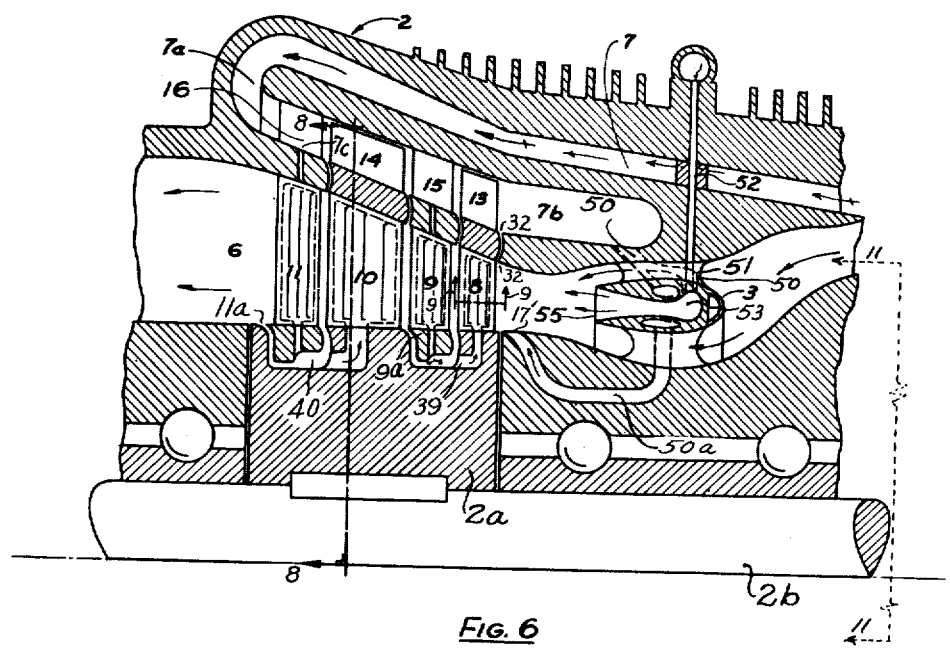
Fig. 6 is an enlarged fragmentary section of the turbine blading, casing and hub.

The air from the passage 7, 7a and 7b supplies slots in the blades and the walls of passage 6 at the proper pressure for each. As shown in Figs. 6 and 6b, air flows through passages 7c into and through the hollow interiors of stator blades 11 and 9, thus supplying air to the surface slots of those blades. Each of the blade stages carries an annular flow controlling member 11a and 9a, respectively, which fit within recesses 40 and 39 of hub 2a and are apertured to provide for supply of fluid pressure to such recesses. As shown more particularly in Fig. 6a, the outlets from said recesses are substantially restricted at either side of the respective members 11a and 9a but is relatively open and in direct communication with the interiors of rotating blades 8 and 10. Thus air under pressure is continuously supplied to the interiors of the blades of both the rotor and the stator.

Restricted outlets 18 and 20 are formed at either side of member 9a with their discharge openings directed downstream of the main flow through the turbine. Similar outlets 22 and 24 are formed at either side of member 11a, the respective flows thus being discharged generally parallel with the walls.

There are slots 32, 34, 36 and 38, similar to the hub slots, between adjacent blades in the outer wall of the passage 6 as shown in part in Fig. 6b. The rings 10a and 8a at the tips of the rotor blades 10 and 8, respectively, have slots 33 and 31 in communication with the interior of the rotor blades to derive air therefrom.

It is important that proper pressure conditions be established at the several slots and passages in order to provide the desired operation and the following is given as an example for purposes of illustration. Assuming first a pressure developed by the compressor and delivered thereby to the passage 7 of 88 pounds per square inch gage. Within the turbine the passage 6 contracts so that it is narrowest at the first rotor, resulting in increased velocity and reduced pressure. At this point the pressure falls to a value about 0.53 of the pressure at the burner or about 45 pounds per square inch gage for an initial pressure of 88.2 pounds per square inch gage. It is necessary then that a jet emitted through the turbine wall into passage 6 have substantially the same velocity as the gas within such passage; however the jet of air being much cooler than the gas, it is denser and will require a greater pressure than the gas to give it the same velocity. Hence the auxiliary pump composed of the blades 13 to 16 is employed to raise the pressure of the air from the compressor 1 to the proper value at the first rotor, or about 140 pounds per square inch gage.

As an example of how the pressures of the cooling air are controlled to provide different pressures at the slots, consider the last stator blade 11. Its interior receives air from passage 7a—7b through duct 7c and conducts it to annular passage 40 in the hub. It will be noted that the interior of the stator blade 11 takes in air at the pressure of the passage 7a which is about 88 pounds per square inch gage as an example. There will be some loss at the bend between 7 and 7a. Since the air has a free passage from the interior of stator blade 11 into the passage 40 the static pressure in blade 11 drops to a low value of the order of 20 pounds per square inch gage. The pressure in passage 40 will be of the order of 15 pounds per square inch gage because of the loss of air through the slots in blade 11. This is the pressure which will serve the hub slot 22 between the blades.

In the rotor blade 10 the air taken from passage 40 at about 15 pounds per square inch gage will have its pressure increased by centrifugal action to about 38 pounds per square inch gage which is the proper value for discharge from the rotor blade slots.

Similar relationships are provided for the flow through stator blade 9 to rotor blade 8. It is to be noted that the pressure of the air entering this stator blade has been further raised in passage 7a by the pressure action of blade 14. Thus the air begins its travel through stator blade 9, passage 39 and rotor blade with a higher initial pressure than the flow into stator blade 11. A typical pressure of the air discharged into blade 9 is 107 pounds per square inch gage, providing a corresponding increased pressure of the discharge from the slots in blades 9 and 8, with reference to blades 11 and 10. This is proper because the total pressure is higher at the zone of blades 8 and 9 than it is in the zone of blades 10 and 11.

For the outer wall slot 32 just ahead of the rotor composed of blades 13, the pressure of the cooling air should be the highest. The air in passage 7b is brought to this value by the combined compressing action of blades 14 and 13. The invention thus assures that the pressure is properly gaged for the various stages of the turbine.

The number of stages is a minimum because the acoustic velocity leads to the maximum power extraction in the first stage, thus requiring fewer stages to extract the remainder of the energy. Since in the main annular turbine passage 6 the pressure falls to the critical value at the passage throat, the velocity of the gas is the same as the velocity of sound in such gas at the pressure and temperature existing at the throat, that is just ahead of the first rotor. This feature of having the whole flow expanded to the acoustic velocity and bathing the whole rotor is an important feature of this invention since it makes possible the minimum number of stages and hence requires only the minimum amount of cooling air. It may be shown by calculation that under these conditions the remainder of the energy may be extracted by a single additional stage.

The rotor blades 8 rotate in the same direction as the peripheral component of the gas velocity at the throat. Although the absolute gas velocity has the acoustic value, the gas velocity relative to the rotor blades is less than the acoustic velocity because of the rotor velocity which as already described is in the same direction, and hence it is possible for the gas to flow in streamlines about the blades. If the gas velocity relative to the blades equalled or exceeded the acoustic velocity streamline flow would not be possible and a compressibility burble would set in. Because the first stage rotor extracts energy from the gas, the velocity of the gas flow is reduced below the acoustic velocity before the gas impinges on the guide vanes aft of the first rotor and therefore efficient streamlined flow over those guide vanes is obtained.

Figures 10, 14:
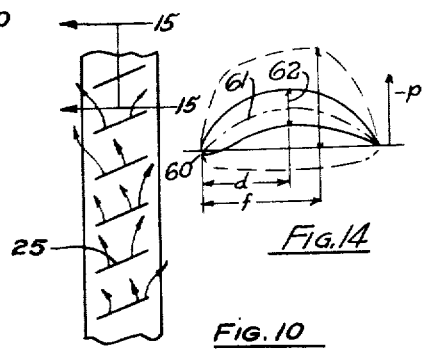
Fig. 10 is a fragmentary end elevational view looking in the direction of the arrows 10—10 in Fig. 9.
Fig. 14 is a diagrammatic representation of the pressure conditions on opposite sides of a blade constructed in accordance with this invention.
Figures 7, 9:
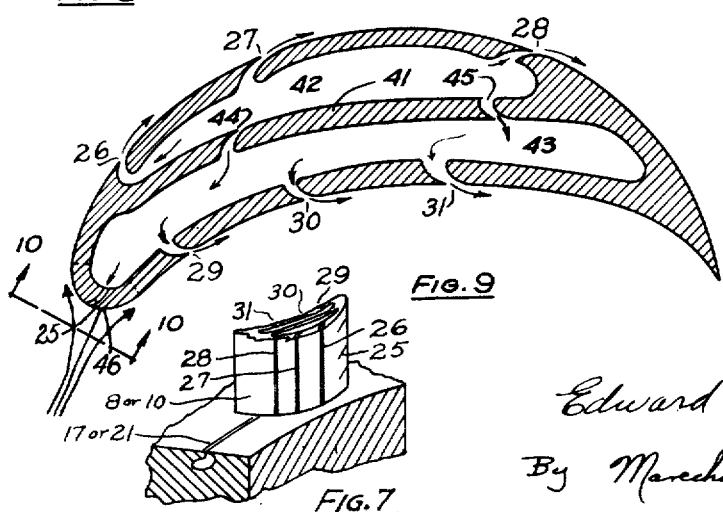
Fig. 7 is another fragmentary axial section of the outer wall of passage 6 taken in a plane a short distance to one side of the section of Fig. 6 and showing the blade in perspective.
Fig. 9 is a chordwise section of a blade taken along line 9—9 in Fig. 6.
Figure 15:
Fig. 15 is a detail sectional view through the nose slot of a blade on the line 15—15 of Fig. 10.

The preferred type of blade is shown in Figs. 9 and 10 and is such that it provides for a low velocity flow past the under surface even at full power of the turbine. In fact pressure surveys on the under-surface of such a blade show that the velocity of the gas flow adjacent the under-surface is only about 15 per cent of the average resultant relative velocity past the blade. The pressure on the under-surface is about 75 per cent of the dynamic head available and is substantially constant across the greater part of the under-surface. As shown the blade has a substantial radius of curvature on both surfaces with a relatively high arching of the mean camber line.

The airfoil section is characterized by the location of the mean camber maximum ordinate at or to the rear of the mid-point of the chord. It is further characterized by the location of the maximum thickness near or to the rear of the mid-point of the chord. Furthermore the value of the nose radius is preferably greater than 8 per cent of the wing maximum thickness and substantially less than the said maximum thickness. The location of the maximum thickness ordinate and the magnitude of the nose radius are important since the desired laminar flow is impaired if the maximum thickness is as far forward as the one-third chord point or if the nose radius is large. It is the location of the maximum thickness and the shape of the section ahead of such maximum thickness which determine the character of the flow and provide for obtaining laminar flow.

The velocity across the upper surface is substantially higher than the average axial velocity and the pressure is substantially reduced above the blade. The velocity across the first 60 per cent of the blade chord is substantially constant and then declines to the main stream velocity at the trailing edge. This means that the pressure is also substantially constant along the first 60 per cent of the upper surface.

The upper blade surface is formed with a series of slots 26, 27, and 28 which are spaced substantially as shown over the upper surface, the outlet of each slot opening rearwardly so as to discharge a flow of air substantially tangentially over the surface. The nose of the blade is provided with slots 25, substantially at the location of the forward stagnation point under normal operating conditions. Rearwardly thereof, the lower blade surface is formed with a series of slots 29, 30, and 31 which are similar to those in the upper surface in spacing and in their direction.

In order for the slots to discharge laminar jets the slot walls must not diverge substantially. They should converge toward the slot exit. Furthermore the jets should be discharged in the direction of the external flow. Hence the slot axis should be directed rearward along the blade surface and not perpendicular thereto. Jets discharged normal to the surface will be turbulent and will therefore transport large quantities of heat from the gas boundary to the wall of the blade.

In order to insure the proper velocities from the slots the interior of the blades (both rotor and stator blades being similar) are divided by the partitions 41 into upper compartments 42 and lower compratments 43. Each partition contains one or more metering slots 44, 45 to provide a differentially higher pressure in compartment 42 than in compartment 43. The air from passages 7c, 39 and 40 is supplied to the compartments 42 of the several blades and from there flows at somewhat reduced pressure into the compartments 43.

The protective flow at the nose is arranged so that for all attitudes of the blade relative to the external flow the hot gases never come directly into contact with the blade. It should be recognized that for changing angles of attack the stagnation point 46 (Fig. 9) shifts and that this point divides the flow for the top of the blade from that for the bottom.

Where the blade is provided with a nose slot, the flow from the slot will pass rearward over either the upper or lower surface on the opposite side of the slot from the stagnation point of the main flow and therefore will not be interposed in protective relation between the main gas flow and the blade surface. Hence the slot flow cannot protect both surfaces from the high temperature of the hot gas flow. Where two such nose slots are provided at least that portion of the blade between the slots is subject to the direct impact of the hot gases and under these conditions also proper protection is not afforded against the highly heated gas flow.

To provide leading edge protection I arrange the nose slots so that they direct the cooling air spanwise in major part. Figs. 9 and 10 show the slots 25 as extending diagonally and having overlapping walls so as to direct their jets in large measure spanwise and over a band along the span having a substantial width so that for any position of the stagnation point their is a protective film.

The blade is designed so that for maximum power and maximum temperatures the flow divides at the nose substantially at the end 60 of the mean camber line 61, Fig. 14. The airfoil section of the blades, of both rotor and stator, is designed especially to keep the cooling streams in a laminar state. This is accomplished by providing a favorable pressure gradient along the contour of the section. Fig. 14 shows the pressure distribution over the upper surface and it will be noted that the lowest pressure is at the distance $f$ from the nose which is the 60 per cent point of the chord. Hence the flow along the contour is being accelerated up to this point by the pressures generated by the blade itself. As long as the flow is accelerated it can be maintained laminar.

On the under surface of the blades pressure surveys indicate that about 75 per cent of the dynamic pressure is attained on the average between the stagnation point and the trailing edge. This means that the velocity has been reduced to about 15 per cent of the general flow at the rotor.

The substantial constancy of the pressure along the under surface means that it is possible to superimpose another pressure gradient so as to make a favorable pressure gradient everywhere. The contour shape and the under surface slots, Fig. 14, make the gradient favorable from 60 to beyond 62.

The burner 3 receives air through the duct 50 in the arms 51 from the passage 7b where the air pressure is highest. Fuel is received from an external supply through the tube 52. The air is discharged under pressure in a substantially tangential direction into the annular combustion space 53. There should be a plurality of fuel and air ducts, four being shown in Fig. 11. The duct 50 is branched to send the major portion of the flow to the chamber 53 and a minor part to the chambers 58 and 59.

Figure 13:
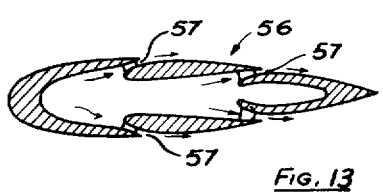
Fig. 13 is a section along the line 13—13 of Fig. 12.
Figure 12:
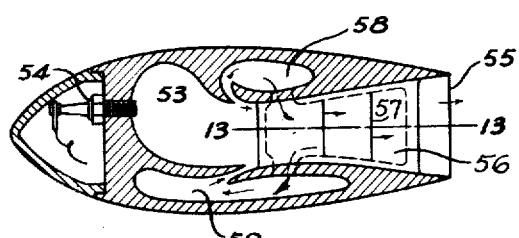
Fig. 12 is a section along line 12—12 of Fig. 11.
Figure 8:
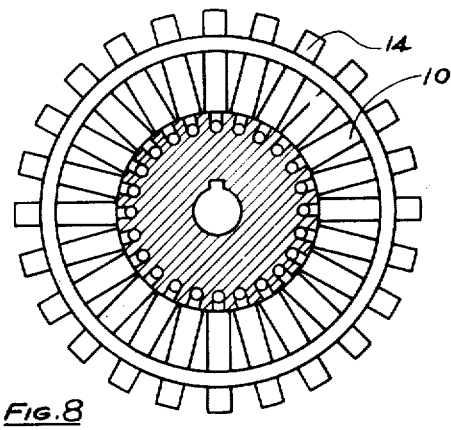
Fig. 8 is a transverse section along the line 8—8 in Fig. 6.

The fuel and air enter the combustion space 53 and proceed circumferentially about it. The mixture is ignited by the spark plug 54 and as the gas burns it proceeds toward the exit 55 guided by the vanes 56. The guide vanes 56, Figs. 11, 12 and 13, are located forwardly of the chamber 53 and are set at a suitable angle to intercept a portion of the peripheral flow and direct it out the opening 55. They are kept cool by the slots 57 in their walls in communication with the ducts 58 receiving air from the passage 50. The duct 59 serves the same purpose as 58.

The slot 17' receives air from 7b through the ducts 50 and 50a, thus affording a high pressure source of air to be discharged from such slot in advance of blade 8.

The invention thus provides a converging duct between the locality of the burner and the first rotor of the turbine so that the first rotor is subject to the acoustic velocity. The rotor is rotated in the same direction as the jet to reduce the relative velocity below the acoustic velocity. The next rotor is in a duct of expanding cross-sectional area. By this means the number of stages to be kept cool is made a minimum and consequently less cooling air need be used. While the cooling air from each stage reduces the thermal efficiency, if there are two stages, the second stage only has its thermal efficiency reduced by the protective cooling air from the first stage. The cool air from the last stage does not mix with this stage and there are no stages following to be adversely affected by the admixture of cold air, hence only half the stages are subjected to gas cooled by the admixture of cooling air.

On the other hand if there were four stages the last 3 or 75 per cent would be adversely affected by the admixture of cold air from the preceding stages.

Each of the blades is provided with a plurality of slots spaced chordwise in both the upper and lower surfaces. These slots are formed to direct jets toward the trailing edge tangentially to the surface so as to provide laminar layers of fluid. The blade section has such a contour as to accelerate the jets from the slots thereby forming and preserving a laminar type of flow.

The slots are spaced chordwise chiefly in the forward part of the blade so that the layers are superimposed to form a thick total layer on the rear 40 per cent of the blade section where the blade pressure gradient is adverse and the layer adjacent the surface becomes turbulent. This layer because of the manner of its formation does not have a steep temperature gradient so that some turbulence within the layer adjacent the surface will not transfer large quantities of heat to the blade wall.

The blade and wall slots open into the turbine gas passage at regions of differing pressure and velocity. Furthermore the cooling air being very much denser than the hot gas and therefore requiring a greater pressure to give it the same velocity, means are provided for increasing the pressure of the air received from the compressor serving the turbine to provide the proper velocity, the pressure at each slot also being properly controlled.

The turbine may be started by the electric motor 65 geared to the turbine shaft by the gear train 66.

The upper side or surface of the blade as used herein refers to the convex or low pressure side of the blade, and the lower side or surface refers to the concave or high pressure side of the blade. The span of the blade is the extent or dimension of the blade in a generally radial direction, while the chord is the extent or dimension transverse to the span from the leading to the trailing edge of the blade.

The invention thus provides a novel and useful gas turbine capable of operating safely and reliably at a high temperature and at a high thermal efficiency without incurring the danger of overheating the working parts in the high temperature zone.

While the forms of apparatus herein described constitute preferred embodiment of the invention, it is to be understood that the invention is not limited to these precise forms of apparatus, and that changes may be made therein without departing from the scope of the invention which is defined in the appended claims.

What is claimed is:

1. In combination, in a gas turbine, walls defining a main passage and an auxiliary passage extending axially along said main passage, means forming spaced slots communicating on the inner wall of said main passage between said auxiliary passage and the wall of said main passage to provide for discharging a flow of cooling gas along said main passage wall surface, said slots having their openings directed downstream along said main passage walls to discharge said low temperature gas to form a protective flow along said main passage walls, means to supply a flow of hot gas to said main passage, means to supply said auxiliary passage with a flow of gas at relatively lower temperature, and means to subject said lower temperature gas to pressures increasing in the upstream direction of flow through said main passage for flow through said slots.

2. In combination, in a gas turbine, walls defining a main passage for the flow of a hot motive gas, means to supply said gas to said passage, a plurality of axially spaced sets of blades mounted within said main passage for rotation about an axis under the action of said flow, said blades having slots in their surface in communication with their interiors, means to discharge jets of fluid from said slots of said blades to provide each blade with a protective discharge jet of fluid, an auxiliary passage forming a longitudinally extending source of air extending along said main passage, means in said auxiliary passage for subjecting the air to pressure varying in magnitude in generally corresponding relation with the varying velocities of the hot gases along said main passage, and means communicating with said pressure source along the longitudinal extent thereof for supplying said jets at different pressures to said blade slots in accordance with the location of said blades along said passage.

3. In combination, in a gas turbine, walls defining a main passage for the flow of a hot motive gas, means to supply hot gas to said main passage, a plurality of blades mounted within said passage for rotation about an axis under the action of said flow of gas, means defining an auxiliary passage extending axially along said main passage, means forming through slots establishing communication between said auxiliary passage and said main passage, each said slot being formed to direct its fluid flow downstream substantially tangentially along the wall of said main passage, means for supplying a flow of relatively cooler gas to said auxiliary passage to provide for discharge of protective jets of fluid through said slots into said main passage in the downstream direction along said passage walls, said slots being spaced axially along said main passage at distances between about 10 and 40 times the slot width to forestall the boundary of the mixing zone of said hot gas and protective fluid downstream from a preceding slot from reaching the wall surface ahead of the succeeding slot.

4. In combination, in a gas turbine, walls defining a main passage for the flow of a hot gas, means to provide a hot gas flow through said main passage, a plurality of sets of blades mounted within said passage for rotation about an axis, said sets being spaced along said axis to form a plurality of rotor stages, an end ring fixed to the ends of each of said blade, said ring having a slot in the surface facing said blades at the junction of each said ring and blade, and means to supply a flow of cooling fluid to said ring slots for discharge therethrough.

5. In combination in a gas turbine, walls defining a main passage for the flow of a hot gas and an auxiliary passage, means to provide a hot gas flow through said main passage, means to induce a flow of protective fluid under substantial pressure through said auxiliary passage, a hub, a plurality of sets of hollow blades mounted on said hub within said main passage for rotation about an axis under the action of said gas flow, said sets being spaced along said axis to form a plurality of rotor stages, said rotor blades having slots leading out of the interiors thereof, a plurality of hollow stator blades alternated along said axis with said rotor stages, the interiors of said stators being in communication with said auxiliary passage to receive a flow of cooling fluid therefrom, and means establishing communication through said hub between the interior of a said stator blade and the interior of a said rotor blade to supply a protective flow to said rotor blade slots.

6. In combination in a gas turbine, walls defining a main passage for the flow of a hot gas and an auxiliary passage, means to provide a hot gas flow through said main passage, means to induce a flow of protective fluid under substantial pressure through said auxiliary passage, a hub, a plurality of sets of hollow blades mounted on said hub within said main passage for rotation about an axis under the action of said gas flow, said sets being spaced along said axis to form a plurality of rotor stages, a plurality of hollow stator blades alternated along said axis with said rotor stages, said rotor blades having slots leading out of the interiors thereof of said stators being in communication with said auxiliary passage to receive a flow of cooling fluid therefrom, means establishing communication through said hub between the interior of a said stator blade and the interior of a said rotor blade to supply a protective flow through said rotor blade slot, and means to provide a higher pressure in said auxiliary passage than in said main passage.

7. In combination in a gas turbine, walls defining a main passage for the flow of a hot gas and an auxiliary passage, means to provide a hot gas flow through said main passage, means to induce a flow of protective fluid under substantial pressure through said auxiliary passage, a hub, a plurality of sets of hollow blades mounted on said hub within said main passage for rotation about an axis under the action of said gas flow, said sets being spaced along said axis to form a plurality of rotor stages, a plurality of hollow stator blades alternated along said axis with said rotor stages, said rotor blades having slots leading out of the interiors thereof, means establishing communication between said auxiliary passage and the interior of a said stator blade, said stator blade having a radially inner part providing for discharge of a flow of air from the interior thereof, and means establishing communication between said inner part of said stator blade and the interior of a rotor blade for the supply of fluid under pressure thereto.

8. In combination in a gas turbine, walls defining a main passage for a flow of a hot gas and defining an auxiliary passage extending counter to said main passage, means to provide a hot gas flow through said main passage, means to provide a flow of cooler protective fluid through said auxiliary passage, a hub, a plurality of sets of hollow blades mounted on said hub for rotation about an axis under the action of said gas, a plurality of hollow stator blades alternating along said axis with said rotor blades, said blades having slots on the surface thereof in communication with their interiors, means providing communication from said auxiliary passage into the interiors of said hollow blades for the supply of said cooler protective fluid under pressure thereto, said blades having portions extending into said auxiliary passage for developing a pressure differential to provide for supply of said cooling air at a higher pressure to a blade which is upstream of the flow through said main passage.

9. In combination with a gas turbine, walls defining a main passage for the flow of hot gas and also defining an auxiliary passage coaxial therewith, means to supply a hot gas flow through said main passage, a hub, a plurality of blades operable in said main passage and mounted on said hub for rotation under the action of said hot gas flow, said blades having portions extending radially beyond said main passage walls and operable in said auxiliary passage for subjecting a gas flow through said auxiliary passage to additional pressure, and means establishing communication between said auxiliary and said main passages through the wall of said main passage downstream from said hot gas supply means.

10. In combination, in a gas turbine, walls defining a main passage and an auxiliary passage extending axially along said main passage, a rotor structure having a hub means with a flow passage therein and a plurality of blades thereon arranged in stages, means forming axially spaced slots in the wall of said main passage and of said hub, means communicating respectively with said auxiliary passage and said hub passage, said slots having their openings into said main passage and directed generally downstream thereof, means to supply a flow of hot gas to said main passage, means to supply a flow of relatively cooler fluid to said auxiliary passage and to said hub passage for discharge therefrom through said slots to provide protective flows overlying the walls of said main passage and of said hub means protecting the same against excessive temperatures.

11. In combination in a gas turbine having a plurality of axially spaced stages of turbine blades mounted for rotation about an axis, a main passage of generally annular shape having inner and outer walls with portions thereof opposite said blades and adapted to house said blades, said passage being adapted to have a hot gas flow therethrough for rotating said blades, a source of cooling fluid under pressure, said outer wall portion of said main passage having openings on the inner surface thereof distributed axially therealong, and means communicating through said wall with said source of cooling fluid to provide a flow of cooling fluid inward to the inside surface of said outer wall to provide a protective film thereover to protect said wall from said hot gas.

12. In combination in a gas turbine having a plurality of axially spaced stages of turbine blades mounted for rotation about an axis, a main passage of generally annular shape having inner and outer walls with portions thereof opposite said blades and adapted to house said blades, said passage being adapted to have a hot gas flow therethrough for rotating said blades, a plurality of sources of cooling fluid under different pressure, said outer wall portion of said main passage having openings on the inner surface thereof distributed axially therealong, and means connecting different said openings through said wall with different said sources of cooling fluid to provide different flows of cooling fluid inward to the inside surfaces of said outer wall to provide a protective film thereover to protect said wall from said hot gas.

13. A gas turbine as defined in claim 5 having stator blades which are provided with slots communicating with the hollow interiors thereof for discharging protective flows over the surfaces thereof.

14. In combination, in a gas turbine, walls defining a main passage, a rotor structure having a hub, means defining a flow passage through said hub, a plurality of blades carried on said hub and arranged for operation in said main passage, means forming at least one slot in the wall surface of said hub, said slot having its opening into said main passage and directed generally downstream thereof, means to supply a flow of hot gas to said main passage, and means to supply a flow of relatively cooler fluid to said hub passage for discharge therefrom through said slot to provide a protective flow overlying the walls of said hub and protecting the same against excessive temperature.

EDWARD A. STALKER.

REFERENCES CITED

The following references are of record in the file of this patent:

UNITED STATES PATENTS

| Number | Name | Date |
|---|---|---|
| 1,708,402 | Schilling | Apr. 9, 1929 |
| 1,828,782 | Morton | Oct. 27, 1931 |
| 1,938,688 | Brooke | Dec. 12, 1933 |
| 1,960,810 | Gordon | May 29, 1934 |
| 2,149,510 | Darrieus | Mar. 7, 1939 |
| 2,220,420 | Meyer | Nov. 5, 1940 |
| 2,236,426 | Faber | Mar. 25, 1941 |
| 2,243,467 | Jendrassik | May 27, 1941 |
| 2,244,467 | Lysholm | June 3, 1941 |
| 2,297,446 | Zellbeck | Sept. 29, 1942 |
| 2,326,072 | Seippel | Aug. 3, 1943 |

FOREIGN PATENTS

| Number | Country | Date |
|---|---|---|
| 215,484 | Switzerland | Oct. 1, 1941 |
| 218,976 | Switzerland | May 1, 1942 |
| 346,599 | Germany | Jan. 5, 1922 |
| 781,057 | France | May 8, 1935 |